US008102931B2

(12) United States Patent
Kim et al.

(10) Patent No.: US 8,102,931 B2
(45) Date of Patent: Jan. 24, 2012

(54) METHOD AND DEVICE FOR OPERATING A PRECODED MIMO SYSTEM

(75) Inventors: Taeyoon Kim, Austin, TX (US); Jayesh H. Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 1508 days.

(21) Appl. No.: 11/529,311

(22) Filed: Sep. 29, 2006

(65) Prior Publication Data

US 2008/0080632 A1    Apr. 3, 2008

(51) Int. Cl.
H04B 7/02 (2006.01)
H04L 1/02 (2006.01)
(52) U.S. Cl. ................... 375/267; 375/316; 375/136
(58) Field of Classification Search ............ 375/267
See application file for complete search history.

(56) References Cited

U.S. PATENT DOCUMENTS

| 7,433,419 | B2 * | 10/2008 | Yun et al. ............... | 375/296 |
|---|---|---|---|---|
| 7,817,745 | B2 * | 10/2010 | Cioffi et al. .............. | 375/296 |
| 2007/0140105 | A1 * | 6/2007 | Coon ..................... | 370/208 |
| 2007/0258392 | A1 * | 11/2007 | Larsson et al. .......... | 370/310 |
| 2009/0296844 | A1 * | 12/2009 | Ihm et al. ............... | 375/267 |

FOREIGN PATENT DOCUMENTS

WO    WO 2006049417 A1 *   5/2006

OTHER PUBLICATIONS

Yan, Z.; Wong, K.M.; Luo, Z.Q.; "Optimal diagonal precoder for multi-antenna communication system", 4th IEEE Workshop on Signal Processing Advances in Wireless Communications, SPAWC 2003, pp. 16-20.*
Collin, L.; Berder, O.; Rostaing, P.; Burel, G.; "Optimal minimum distance-based precoder for MIMO spatial multiplexing systems", IEEE Transactions on Signal Processing, vol. 52 , Issue: 3, 2004 , pp. 617-627.*
Zhiyong Yan; Wong, K.M.; Zhi-Quan Luo; "Optimal diagonal precoder for multiantenna communication systems", IEEE Transactions on Signal Processing, vol. 53 , Issue: 6, 2005 , pp. 2089-2100.*
Sampath et al., Hemanth. "Generalized Linear Precoder and Decoder Design for MIMO Channels Using the Weighted MMSE Criterion," *IEEE Transactions on Communications*. vol. 49, No. 12 (Dec. 2001): pp. 2198-2206.
Scaglione et al., Anna. "Optimal Designs for Space-Time Linear Precoders and Decoders," *IEEE Transactions on Signal Processing*. vol. 50, No. 5 (May 2002): pp. 1051-1064.

* cited by examiner

*Primary Examiner* — Shuwang Liu
*Assistant Examiner* — Nader Bolourchi
(74) *Attorney, Agent, or Firm* — Gazdzinski & Associates, PC

(57) ABSTRACT

A method is provided for generating precoder data (600), comprising: obtaining transmit power data indicative of a transmit power of a plurality of multiple-input/multiple-output signals (610); obtaining signal quality data, the signal quality data including at least one measure of a quality of the plurality of multiple-input/multiple-output signals (620, 630); obtaining channel data with respect to a wireless channel, the channel data including a measure of respective channel parameters of each of a plurality of channel paths in the wireless channel (620, 630); constraining one or more system performance parameters (640); and determining first and second precoder diagonal values ($w_A$ and $w_B$) based on the signal quality data, the transmit power data, the channel data, and the one or more constrained system performance parameters (650).

15 Claims, 4 Drawing Sheets

METHOD AND DEVICE FOR OPERATING A PRECODED MIMO SYSTEM

FIELD OF THE INVENTION

The present invention relates in general to a system and method for generating multiple input/multiple output (MIMO) signals.

BACKGROUND OF THE INVENTION

When transmitting data across a medium, wired or wireless, it is generally desirable to increase the amount of data that is sent at a given time to allow for a higher data rate for the underlying system. In a single-antenna, wireless transmission system, typically a single stream of data is transmitted.

However, using a multiple antenna system, multiple streams can be transmitted and received using the same time and frequency resources, and correspondingly more information can be sent over the available bandwidth. As shown below, it is possible to use multiple antenna systems and multi-input, multi-output (MIMO) systems interchangeably. In MIMO systems, there are a number of possible signal paths through the transmission medium equal to the number of transmitting antennas multiplied by the number of receiving antennas.

FIG. 1 is a block diagram illustrating a conventional MIMO transmitter/receiver pair. As shown in FIG. 1, a transmitter includes a MIMO modulator 110, an antenna 130, and an antenna 135, while a receiver includes a MIMO demodulator 120, an antenna 140, and an antenna 145. The MIMO modulator receives transmit signals and modulates them for transmission over antenna 130 and antenna 135. These signals are received at antenna 140 and antenna 145, and the received signals are demodulated at the MIMO demodulator 120 to extract a received signal.

Because there are two transmitting antennas 130 and 135, and two receiving antennas 140 and 145, there are four possible signal paths through the transmission channel. There is a path from the antenna 130 to the antenna 140; a path from the antenna 130 to the antenna 145; a path from the antenna 135 to the antenna 140; and a path from the antenna 135 to the antenna 145. MIMO systems with a larger number of transmitting or receiving antennas would have a correspondingly larger number of possible signal paths.

The MIMO receiver antennas 140 and 145 thus each receive a copy of each signal transmitted from all of the transmitting antennas. But each copy of a transmitted signal from a given transmitter antenna passes through a different portion of the transmission channel, and is multiplied by a different channel coefficient.

In particular, $h_{11}$ represents a channel portion from a transmitter 130 antenna to a receiver antenna 140; $h_{21}$ represents a channel portion from the transmitter antenna 130 to a receiver antenna 145; $h_{12}$ represents a channel portion from the transmitter antenna 135 to the receiver antenna 140; and $h_{22}$ represents a channel portion from the transmitter antenna 135 to the receiver antenna 145. A general representation H of the transmission channel, as it pertains to the MIMO transmitter and receiver, can then be written as a matrix of the individual channel coefficients $h_{11}$, $h_{12}$, $h_{21}$, and $h_{22}$. In other words, $$H_{22} = \begin{bmatrix} h_{11} & h_{12} \\ h_{21} & h_{22} \end{bmatrix}. \tag{1}$$

More generically a channel $H_{MN}$ can be written as an (N×M) matrix where M is the number of transmit antennas and N is the number of receiver antennas. Thus, a (3×2) MIMO system will have a channel represented by a channel matrix $H_{32}$:

$$H_{32} = \begin{bmatrix} h_{11} & h_{12} & h_{13} \\ h_{21} & h_{22} & h_{23} \end{bmatrix}, \tag{2}$$

while a (4×2) MIMO system will have a channel represented by a channel matrix $H_{42}$:

$$H_{42} = \begin{bmatrix} h_{11} & h_{12} & h_{13} & h_{14} \\ h_{21} & h_{22} & h_{23} & h_{24} \end{bmatrix} \tag{3}$$

A transmitter with a single antenna can only modulate data in time. In other words, it can only send different portions of data through the antenna at different times. A MIMO transmitter, in contrast, can modulate the data in both space and time. In other words, in addition to sending different portions of data at different times, the MIMO transmitter can also send different portions of data over the different antennas as the same time. This allows a MIMO transmitter to send a larger amount of data in the same time period as compared to a single antenna system.

A MIMO transmitter typically maps a stream of modulated data bits to be sent to a receiver into an appropriate space time code (STC) for transmission. This space-time code (STC) uses the dimensions of space and time to encode the multiple data bits. Space is employed through the use of an array of multiple antennas; time is used by having each antenna in the array send a series of transmitted symbols in succession. In particular, one or more bits from a transmit bit stream are mapped onto a plurality of symbols $s_1$-$s_N$ chosen from a known constellation of available symbol values, which are used to populate an STC matrix S that represents how the symbols will be sent to the receiver. In particular each symbol will be chosen to represent one or more bits from the bit stream.

The STC matrix S is an (M×K) matrix, where M represents the number of antennas used by the transmitter, and K represents the number of symbols sent by each transmitter for a given set of mapped bits. By way of example a MIMO system in which the transmitter had four antennas (i.e., M=4), and for which each antenna transmits two symbols for a given set of mapped bits (i.e., K=2) will be described. It will be understood, however, that this description can apply generally to situations in which M and K have different values.

In this exemplary (4×L) MIMO system, where L>=2, the STC matrix S is a (4×2) matrix that can be written as:

$$S = S_{42} = \begin{bmatrix} s_1 & s_5 \\ s_2 & s_6 \\ s_3 & s_7 \\ s_4 & s_8 \end{bmatrix}, \tag{4}$$

Where $s_1$, $s_2$, $s_3$, $s_4$, $s_5$, $s_6$, $s_7$, and $s_8$ represent the symbols that the transmitter will be sending to the receiver.

The MIMO receiver receives the various signals at its receiver antennas from across the various individual channel portions, and its MIMO demodulator 120 uses MIMO signal processing to extract the different portions of data that were sent.

In addition, rather than increasing data rate, a MIMO system could also use be used to increase the range of the transmission system by increasing the level of redundancy, error correction, or the like.

One way to estimate the transmitted symbols is to use a minimum mean square estimation (MMSE) operation. MMSE receivers operate by minimizing the mean square estimate of an error in the received signal in an effort to optimize data reception, as would be understood by one skilled in the art.

With MMSE, the receiver measures the error between a set of estimated parameters and the actual value of those parameters. By squaring this error term and minimizing it, the actual error can be minimized MMSE estimation techniques are well known in the art.

Still another way to improve error performance is to use an MMSE operation with successive interference cancellation (SIC). In an MMSE-SIC system, a plurality of co-located signals are iteratively cancelled out.

MMSE-SIC uses an MMSE matrix filter at each stage to estimate received symbol (i.e., symbols in an embodiment in which each received signal contains one symbol). In order to cancel out the received symbol, the effect of that symbol is removed from the received signal and a new resultant reduced system of equations is formed. MMSE-SIC techniques are well know in the art, as are the methods of cancelling the effect of given symbols and deriving the equations of the resultant system for the rest of the symbols.

A typical MMSE matrix filter is defined by the following equation:

$$G_{MMSE} = \left(H^H H + \frac{1}{\rho}I\right)^{-1} H^H. \quad (5)$$

where $G_{MMSE}$ is the gain of the filter, H is the channel matrix, $H^H$ is the Hermitian conjugate of the channel matrix H, I is the identity matrix, and $\rho$ is the averaged SNR, calculated by the equation:

$$\rho = \frac{E_s}{N_o}, \quad (6)$$

where $E_s$ is the energy per symbol, and $N_o$ is the noise power spectral density.

However, because a wireless channel H is a fading channel (i.e., signals passing through it reflect off of objects and take multiple paths to the receivers), each transmitted signal experiences fading, causing a reconstructed signal at the MIMO receiver to itself experience fading. This fading can require an increased cost and complexity for the MIMO receiver to properly process the faded signal, and increased time for such back end processing.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Figure 1:
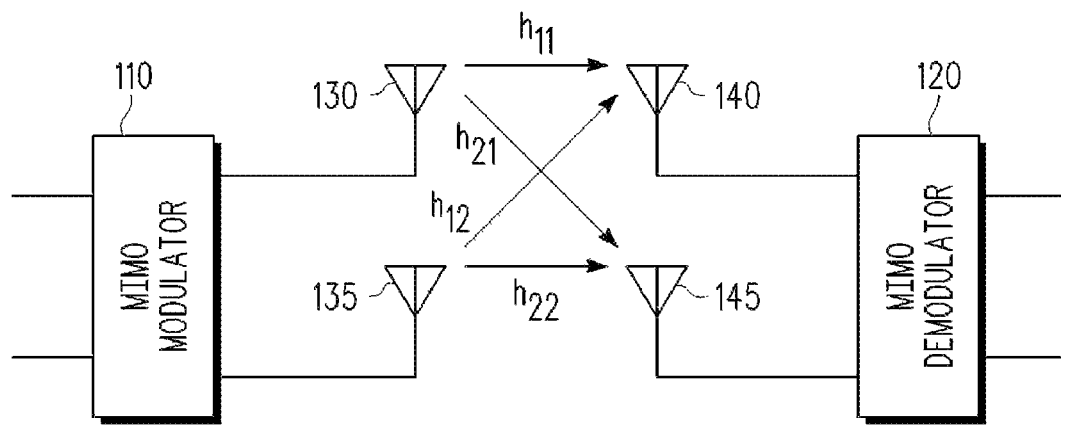
FIG. 1 is a block diagram illustrating a conventional MIMO transmitter/receiver pair.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best implemented in integrated circuits (ICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

Space Time Encoding

The STC matrix S can actually be considered as a collection of K STC arrays $s_t$ of length M, each representing the transmissions from the M transmit antennas at a given time t. For example, the (4×2) STC matrix $S_{42}$ can be split into a (4×1) array $s_{t1}$ that represents the transmissions of the M transmit antennas at a time $t_1$, and a (4×1) array $s_{t2}$ that represents the transmissions of the M transmit antennas at a time $t_2$, as follows:

$$s_{t1} = \begin{bmatrix} s_1 \\ s_2 \\ s_3 \\ s_4 \end{bmatrix}, \text{ and} \quad (5)$$

$$s_{t2} = \begin{bmatrix} s_5 \\ s_6 \\ s_7 \\ s_8 \end{bmatrix}. \quad (6)$$

In other words, at time $t_1$, the first transmitter antenna will transmit symbol $s_1$, the second transmitter antenna will transmit symbol $s_2$, the third transmitter antenna will transmit symbol $s_3$, and the fourth transmitter antenna will transmit symbol $s_4$. Then at time $t_2$, the first transmitter antenna will transmit symbol $s_5$, the second transmitter antenna will transmit symbol $s_6$, the third transmitter antenna will transmit symbol $s_7$, and the fourth transmitter antenna will transmit symbol $s_8$.

In some embodiments, the symbols $s_1$, $s_2$, $s_3$, $s_4$, $s_5$, $s_6$, $s_7$, and $s_8$ can be separate symbols, each representing one or more bits of data. However, in alternate embodiments one or more of the symbols in the STC matrix S can be a copy of another encoded symbol or derived from another signal, thus providing duplicate information within the STC matrix S, making the matrix more robust.

Thus, at one extreme, each position in the STC matrix S is provided with its own symbol; at the other extreme, the same symbol representing the same one or more bits, could be repeated in every location in the STC matrix S. In various other embodiments a number of symbols between one and the total matrix size can be encoded.

For example, one type of STC matrix S that is used in some embodiments for a (4×L) system (i.e., a 4 transmit antenna system) is shown below. An exemplary STC matrix $S_{42}$ is shown for a (4×2) system (i.e., a system with four transmit antennas and two receive antennas). However, this is by way of example only and could be extended to apply to systems in which a larger number of receive antennas are used. In this example $S_{42}$ is shown as follows $$S_{42} = \begin{bmatrix} s_1 & -s_2^* \\ s_2 & s_1^* \\ s_3 & -s_4^* \\ s_4 & s_3^* \end{bmatrix}, \quad (9)$$

where $s^*_1$, $s^*_2$, $s^*_3$ and $s^*_4$ are the conjugates of the symbols $s_1$, $s_2$, $s_3$, and $s_4$, respectively.

In other words, to make the STC matrix $S_{42}$, from the general STC matrix of equation (4), the following equalities are true:

$$s_5 = -s^*_2, \quad (10)$$

$$s_6 = s^*_1, \quad (11)$$

$$s_7 = -s^*_4, \text{ and} \quad (12)$$

$$s_8 = s^*_3. \quad (13)$$

Similarly, for a (3×L) MIMO system, where L>=2, one STC matrix used in one embodiment is denoted as $S_{32}$ is denoted as $$S_{32} = \begin{bmatrix} s_1 & -s_2^* \\ s_2 & s_1^* \\ s_3 & -s_4^* \end{bmatrix}, \quad (14)$$

with similar substitutions being made for the elements in a general (3×2) STC matrix $S_{32}$.

In both of these exemplary cases, a number of data bits are encoded into four separate symbols $s_1$, $s_2$, $s_3$, and $s_4$. The B-matrix $S_{42B}$ for a (4×2) MIMO system is populated with the four original symbols, $s_1$, $s_2$, $s_3$, and $s_4$, as well as the symbol conjugates $s^*_1$ and $s^*_3$, and the inverse symbol conjugates $-s^*_2$ and $-s^*_4$. Similarly, the B-matrix $S_{32B}$ for a (3×2) MIMO system is populated with the three original symbols, $s_1$, $s_2$, and $s_3$, as well as the symbol conjugate $s^*_1$, and the inverse symbol conjugates $-s^*_2$ and $-s^*_4$. Thus, for both of these examples, four symbols, each representing one or more bits, are space-time encoded into the STC matrix S.

Each of the N receiver antennas then receives each of the M transmitted signals along a respective signal path for each of the K time intervals. The signals received at the N receiver antennas over the K time intervals can thus be written as an (N×K) receive matrix Y, such that:

$$Y = HS + N, \quad (15)$$

where H is the (L×M) channel matrix that represents the effect of the transmission channel on a transmitted signal, S is the (M×K) STC array representing the signals transmitted from the M transmitter antennas, and N is an (L×K) noise matrix indicating the noise components received at the L receiver antennas over the K time intervals.

For example, in an embodiment with two receiver antennas (i.e., L=2), and in which each transmitter antenna transmits two symbols for each set of mapped bits (i.e., K=2), Y and N can be represented as follows:

$$Y = \begin{bmatrix} y_1 & y_3 \\ y_2 & y_4 \end{bmatrix}, \text{ and} \quad (16)$$

$$N = \begin{bmatrix} n_1 & n_3 \\ n_2 & n_4 \end{bmatrix}. \quad (17)$$

where $y_1$ and $y_2$ are the signals received at a first and second receiver antennas, respectively, at a first time interval, and $y_3$ and $y_4$ are the signals received at the first and second receiver antennas, respectively, at a second time interval; and where $n_1$ and $n_2$ are noise components received at a first and second receiver antennas, respectively, at a first time interval, and $n_3$ and $n_4$ are noise components received at the first and second receiver antennas, respectively, at a second time interval.

The receive matrix Y is decoded to retrieve the encoded data bits typically with the objective of minimizing the bit error rate (BER), packet error rate (PER), or other some other signal quality measurement.

MIMO System with Precoding

One way to limit the effect of fading on a received MIMO signal is to apply a precoder W to the MIMO signal to be transmitted (i.e., to the STC matrix S) that will account for the degree of fading the MIMO signals will experience. The precoder W is preferably selected to account for a current condition of the channel H, and can be either generated by the transmitter, or supplied to the transmitter by an outside source (e.g., the receiver).

Figure 2:
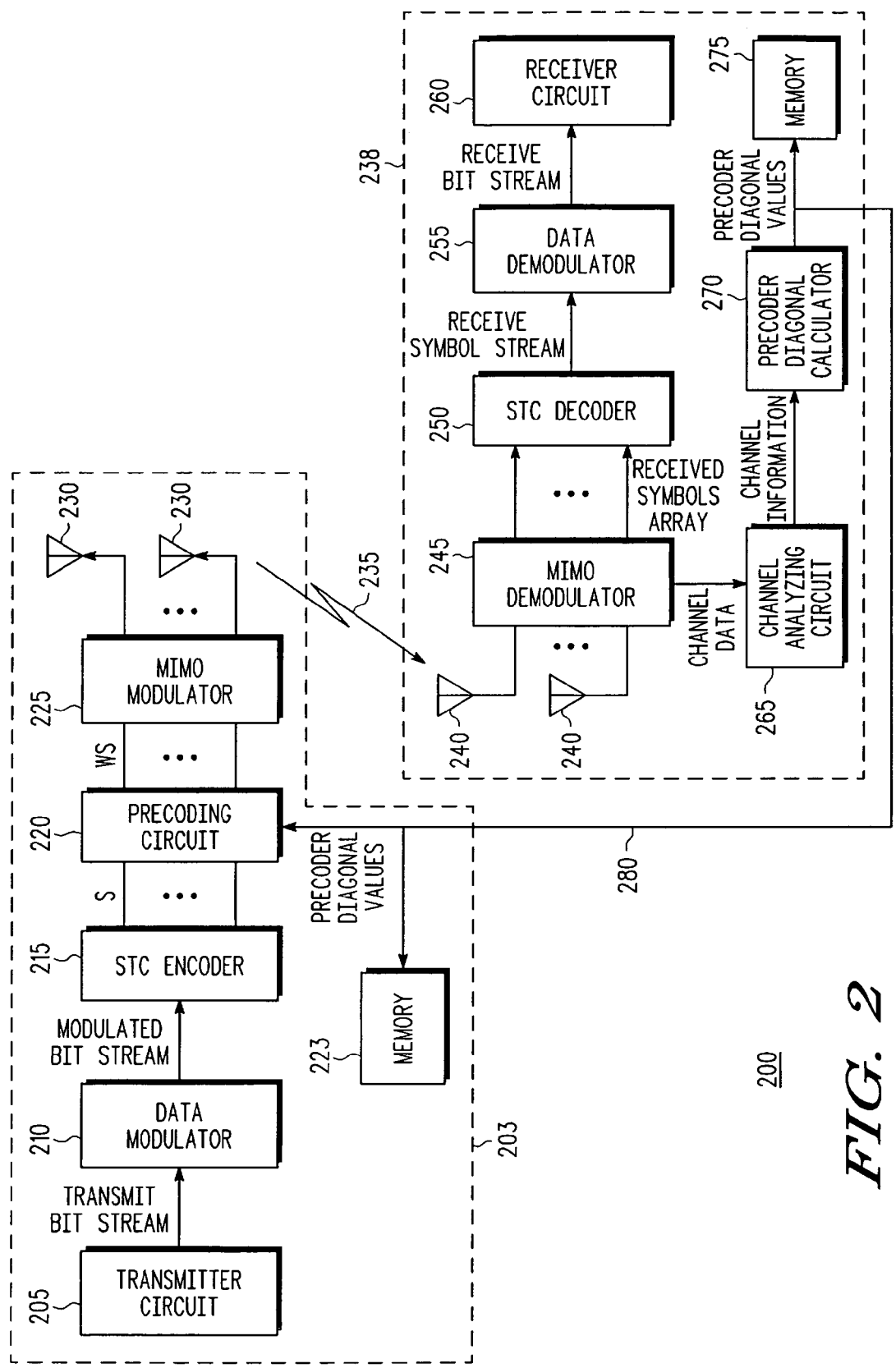
FIG. 2 is a block diagram illustrating a MIMO transmitter/receiver pair according to a disclosed embodiment.

FIG. 2 is a block diagram illustrating a MIMO transmitter/receiver pair according to a disclosed embodiment. As shown in FIG. 2, the MIMO transmitter/receiver pair 200 includes a MIMO transmitter 203 and a MIMO receiver 238, each placed at a different location, between which data must be sent. The MIMO transmitter 203 includes a transmitter circuit 205, a data modulator 210, a space-time code (STC) encoder 215, a precoding circuit 220, a memory 223, a MIMO modulator 225, a plurality of M MIMO transmitter antennas 230, and a memory 235. The MIMO receiver 238 includes a plurality of L MIMO receiver antennas 240, a MIMO demodulator 245, an STC decoder 250, a data demodulator 255, a receiver circuit 260, a channel analyzing circuit 265, a precoder diagonal calculator 270, and a memory 275.

The transmitter circuit 205 represents an operational circuit on the transmitter 203 that generates a transmit bit stream that needs to be sent to the receiver 238. This could be a cell phone, an audio-video device, a computer device, or any sort of device that needs to transmit data.

The data modulator 210 converts the transmit bit stream into a transmit symbol stream by mapping the bits from the bit stream onto a plurality of symbols chosen from a set symbol constellation. In some embodiments one bit could be mapped onto one symbol, while in others multiple bits could be mapped to a single symbol.

The STC encoder 215 receives the transmit symbol stream from the data modulator 210 and maps a number of symbols from the transmit symbol stream into an appropriate STC matrix S, as described above with respect to equations (4) and (7)-(14). The STC encoder 215 includes all of the information necessary regarding the constellation of available symbols, the correspondence of symbols to data bits, and the particular STC used to encode data bits into the STC matrix S.

The precoding circuit 220 multiplies the STC matrix S with a precoding matrix W to obtain a precoded matrix P, i.e., $$P = W \cdot S. \tag{18}$$

This has the effect of applying the linear transform W to the individual length M STC arrays $s_t$ that form the STC matrix S, resulting in the formation of a corresponding set of length M precoded arrays $p_t$ output from the precoding circuit 220, i.e., $$p_t = W \cdot s_t \tag{19}$$

The dimensions of the precoder W in the precoding circuit 220 depend upon the number of transmit antennas 230. In particular, W is an (M×M) array so that multiplying the precoding matrix W and an STC array $s_t$ will result in a precoded arrays $p_t$ of the same size as the STC array $s_t$. Thus, for a (4×L) MIMO system, the precoding matrix $W_4$ will be a (4×4) matrix, i.e., $$W = W_4 = \begin{bmatrix} w_{4-1} & w_{4-5} & w_{4-9} & w_{4-13} \\ w_{4-2} & w_{4-6} & w_{4-10} & w_{4-14} \\ w_{4-3} & w_{4-7} & w_{4-11} & w_{4-15} \\ w_{4-4} & w_{4-8} & w_{4-12} & w_{4-16} \end{bmatrix}, \tag{20}$$

while for a (3×L) MIMO system, the precoding matrix $W_3$ will be a (3×3) matrix, i.e., $$W = W_3 = \begin{bmatrix} w_{3-1} & w_{3-4} & w_{3-7} \\ w_{3-2} & w_{3-5} & w_{3-8} \\ w_{3-3} & w_{3-6} & w_{3-9} \end{bmatrix}. \tag{21}$$

The precoding circuit 220 thus effectively modifies the STC matrix S based on the precoder W before the transmitter can transmit them. By choosing an appropriate precoder W, the precoding circuit 220 can likewise change the compress, elongate, or rotate the constellation of $s_1$.

The memory 223 can store a set of precoder diagonal values that the precoding circuit 220 uses to generate the precoding matrix W, as will be described below. In some embodiments the memory 223 can receive these precoder diagonal values from an external source (e.g., the receiver 238) or could generate them itself.

The MIMO modulator 225 takes each precoded array $p_t$ output from the precoding circuit 220, and converts each of the M elements in the precoded array $p_t$ into an appropriate signal for transmission.

The plurality of M MIMO transmitter antennas 230 then respectively transmit the M signals received from the MIMO modulator 225 over the wireless channel as a wireless signal 235. Each of the plurality of L MIMO receiver antennas 240 in turn receives all of these M signals over a variety of channel paths (e.g., $h_{11}$, $h_{12}$, $h_{21}$, $h_{22}$, etc.), as described above with respect to FIG. 1 and equations (1)-(3).

The MIMO demodulator 245 takes the signals received at the N receiver antennas 240 over the K time intervals and converts them into corresponding symbols to form a receive matrix Y of received symbols, such that:

$$Y = HP + N, \tag{22}$$

Or, more generally, $$Y = HWS + N \tag{23}$$

The STC decoder 250 then takes the matrix Y of received symbols and uses its symbol elements to extract a receive symbol stream that is an estimate of the transmit symbol stream. The STC decoder 250 will know the correlation of symbols in the transmit symbol stream to symbols in the STC matrix, as used by the STC encoder 215.

The data demodulator 255 knows the correlation of symbols to bits, and so takes the receive symbol stream and converts it to a receive bit stream.

Because of fading and noise, the transmitted signal suffers degradation and affects the performance of the receiver or receiver circuit which extracts the transmitted symbols from the received matrix Y. An appropriate design of the precoding matrix W in a precoded space-time system helps improve the performance of the communication system and may also help in simplification of the receiver design. The disclosed embodiments in the sequel propose precoding matrices for the space-time matrices $S_{42}$ and $S_{32}$ for 4×L and 3×L MIMO systems respectively, where L>=2.

The receiver circuit 260 represents the device within the receiver 238 that uses the receive bit stream. This could be a cell phone, an audio-video device, a computer device, or any sort of device that needed to receive data. The receiver circuit 260 includes the circuitry necessary to take the receive matrix Y and any gathered channel information and calculate the precoder diagonal values $w_A$ and $w_B$.

The channel analyzing circuit 265 takes channel data from the MIMO demodulator 245 and use this channel data to determine needed channel information (e.g., channel parameters for the channel matrix H, and the noise variance $\sigma^2$). This can occur, for example, when a set of know pilot data is sent across the channel.

The precoder diagonal calculator 270 takes the channel information from the channel analyzing circuit 265, along with any other required system information (e.g., system transmit power $P_t$), and uses this data to generate precoder diagonal values for creating a precoding matrix W, as described below. In various embodiments the precoder diagonal values could be generated and stored or sent as a pair of scalar values or as a vector value.

The precoder diagonal calculator 270 can store these precoder diagonal values in the memory 275 for future use, or could send them over a feedback channel 280 to the transmitter 203. If sent over a feedback channel 280, these precoder diagonal values can be provided directly to the precoding circuit 220 or could be provided to the memory 223, which can store the precoder diagonal values for later use.

Minimum Mean Square Estimation—Successive Interference Cancellation

In one disclosed embodiment, the MMSE-SIC receiver cancels out one signal at a time. For example, at each stage of the MMSE-SIC receiver, the stream with the highest signal-to-interference-and-noise ratio (SINR) could be selected for cancellation. In another disclosed embodiment, the SIC decoder decodes the received symbols in pairs for cancellation, choosing the signal pair with the highest SINR for signal cancellation at any given stage.

On one embodiment, the SINR on the $k^{th}$ decoded stream can be calculated based on the equation:

$$SINR_k = \frac{1}{[(\rho H_R^H H_R + I)^{-1}]_{k,k}} - 1 \qquad (24)$$

Where I is the identity matrix, $H_R$ is a reduced channel matrix at each cancellation stage, and $H_R^H$ is the Hermitian conjugate of the reduced channel matrix $H_R$.

Based on equation (24), the SINRs of the remaining streams can be calculated at each stage, and the stream with the highest SINR can be selected for decoding.

Some particular embodiments allow for a simpler SINR estimation, however, and therefore a simpler process of performing SIC. For example a (3×2) or (4×2) MIMO system that uses the STC matrices $S_{32}$ and $S_{42}$ respectively and performs SIC by symbol pairs can allow the SINR for the symbol pairs to be estimated using a relatively simple calculation that requires only knowledge of the transmission channel H and the noise variance $\sigma^2$.

The elements of the channel matrix $H_{32}$ or $H_{42}$ can easily be determined during a calibration or testing process. In such a process, the transmitter can send a pilot data samples across the channel, allowing the receiver to estimate the parameters of the channel matrix. The noise variance $\sigma^2$ can also be calculated for a received signal with well known techniques in the art.

Proposed Precoder Design and its Calculation

In one disclosed embodiment the precoding matrix for a (3×2) MIMO system or a (4×2) MIMO system is formed as a diagonal matrix with just two unique elements $w_A$ and $w_B$. In particular, a (4×2) MIMO system uses the precoding matrix $W_4$:

$$W_4 = \begin{bmatrix} w_A & 0 & 0 & 0 \\ 0 & w_A & 0 & 0 \\ 0 & 0 & w_B & 0 \\ 0 & 0 & 0 & w_B \end{bmatrix}, \qquad (25)$$

which is simply the (4×4) precoding matrix $W_4$ in which the elements $w_{4-1}$ and $w_{4-6}$ are set equal to $w_A$; the elements $w_{4-11}$ and $w_{4-16}$ are set equal to $w_B$, and all of the other elements are set to zero.

Similarly, a (3×2) MIMO system a uses the precoding matrix $W_3$:

$$W_3 = \begin{bmatrix} w_A & 0 & 0 \\ 0 & w_A & 0 \\ 0 & 0 & w_B \end{bmatrix}, \qquad (26)$$

which is simply the (3×3) precoding matrix $W_3$ in which the elements $w_{3-1}$ and $w_{3-5}$ are set equal to $w_A$; the element $w_{3-9}$ is set equal to $w_B$, and all of the other elements are set to zero.

In each case, W is a diagonal matrix in which the elements $w_A$ and $w_B$ (which can be referred to as precoder diagonal values) form the diagonal elements in the matrix W. The precoding circuit 220 can thus generate the required precoding matrix W in these embodiments by receiving only the values for the two elements $w_A$ and $w_B$. In the following embodiments with the (3×2) or (4×2) MIMO systems that use the STC matrices $S_{32}$ and $S_{42}$ respectively, MMSE-SIC decoding can be done in symbol pairs since the SINR values are pair wise identical. In particular, the pair having the highest SINR value is decoded first, followed by cancellation of their effect from the received signal and then decoding the other pair. The pairs consist of the symbols $(s_1, s_2)$ is defined as the first symbol pair and the pair $(s_3, s_4)$ is defined as the second symbol pair. In this embodiment, instead of calculating the SINRs and comparing them, a computationally cheaper, albeit equivalent, method is used. The following symbols, signal quality factors, $\alpha_1$ and $\alpha_2$ are defined below, which are used to determine which symbol pair is decoded first.

For a (3×2) MIMO system $\alpha_1$ and $\alpha_2$ can be determined as follows:

$$\alpha_1 = \frac{3}{4}(|h_{11}|^2 + |h_{12}|^2 + |h_{21}|^2 + |h_{22}|^2), \text{ and} \qquad (27)$$

$$\alpha_2 = \frac{3}{2}(|h_{13}|^2 + |h_{23}|^2) \qquad (28)$$

where $h_{11}$, $h_{12}$, $h_{13}$, $h_{21}$, $h_{22}$, and $h_{23}$ are elements in a channel matrix $H_{32}$ for the (3×2) MIMO system.

For a (4×2) MIMO system $\alpha_1$ and $\alpha_2$ can be determined as follows:

$$a_1 = |h_{11}|^2 + |h_{12}|^2 + |h_{21}|^2 + |h_{22}|^2, \text{ and} \qquad (29)$$

$$a_2 = |h_{13}|^2 + |h_{14}|^2 + |h_{23}|^2 + |h_{24}|^2 \qquad (30)$$

where $h_{11}$, $h_{12}$, $h_{13}$, $h_{14}$, $h_{21}$, $h_{22}$, $h_{23}$, and $h_{24}$ are elements in a channel matrix $H_{42}$ for the (4×2) MIMO system.

The values of the SINR estimate $\alpha_1$ and $\alpha_2$ can then be compared to determine the proper cancellation order. If $\alpha_1 \geq \alpha_2$, then the system should initially decode and cancel the first symbol pair, and then decode and the second symbol pair (i.e., use a first canceling order). If, however, $\alpha_1 < \alpha_2$, then the system should initially decode and cancel the second symbol pair, and then decode the first symbol pair (i.e., use a second canceling order). The SINR estimates $\alpha_1$ and $\alpha_2$ in the embodiments described above, along with some other readily-known information can also be used to generate the precoder diagonal values $w_A$ and $w_B$ of the proposed diagonal precoding matrices $W_3$ or $W_4$ disclosed above with respect to equations (22) and (23).

In particular, knowledge of the transmit power $P_t$, and the channel matrix H, and the noise variance $\sigma^2$ are all that is needed to generate the precoder diagonal values $w_A$ and $w_B$. The process is shown as follows.

For a (3×2) MIMO system, the transmit power $P_t$ can be written as:

$$P_t = 2w_A^2 + w_B^2, \quad (31)$$

while for a (4×2) MIMO system the transmit power $P_t$ can be written as:

$$P_t = 2(w_A^2 + w_B^2) \quad (32)$$

Since the value for $P_t$ will be a known quantity, this provides an equation that relates the values of $w_A$ and $w_B$.

In addition two intermediate channel factors $\beta_1$ and $\beta_2$ can be determined for a (3×2) MIMO system based on the channel matrix H, as follows:

$$\beta_1 = \frac{3}{2\sqrt{2}}(h_{11}^* h_{13} + h_{21}^* h_{23}), \text{ and} \quad (33)$$

$$\beta_2 = -\frac{3}{2\sqrt{2}}(h_{12} h_{13}^* + h_{22} h_{23}^*), \quad (34)$$

while for a (4×2) MIMO system, the two intermediate channel factors $\beta_1$ and $\beta_2$ can be determined as follows:

$$\beta_1 = h_{11}^* h_{13} + h_{12} h_{14}^* + h_{21}^* h_{23} + h_{22} h_{24}^*, \text{ and} \quad (35)$$

$$\beta_2 = h_{11}^* h_{14} - h_{12} h_{13}^* + h_{21}^* h_{24} - h_{22} h_{23}^* \quad (36)$$

These intermediate channel factors $\beta_1$ and $\beta_2$, which calculated using known information regarding the respective channel matrix H, can in turn be used to calculate an intermediate channel factor $\beta_3$, according to the following equation:

$$\beta_3 = |\beta_1|^2 + |\beta_2|^2, \quad (37)$$

Then, once values of $\alpha_1$, $\alpha_2$, and the channel factor $\beta_3$ are known, a new equality can be set, based on the order used for MMSE-SIC, as determined by the values of $\alpha_1$ and $\alpha_2$. If the first canceling order for MMSE-SIC is used (i.e., if $\alpha_1 \geq \alpha_2$), then $w_A$ and $w_B$ can be calculated using equation (31) or (32) and the following equality:

$$(w_A^2 a_1 + \sigma^2)(w_B^2 a_2 + \sigma^2) - w_A^2 w_B^2 \beta_3 = (w_B^2 a_2 + \sigma^2)^2, \text{ and} \quad (38)$$

But if the second canceling order for MMSE-SIC is used (i.e., $\alpha_1 < \alpha_2$), then $w_A$ and $w_B$ can be calculated using equation (31) or (32) and the following equality:

$$(w_A^2 a_1 + \sigma^2)(w_B^2 a_2 + \sigma^2) - w_A^2 w_B^2 \beta_3 = (w_A^2 a_1 + \sigma^2)^2, \quad (39)$$

In the above the equalities are derived by constraining the SINRs of the first symbol pair and the SINR of the second symbol pair to be equal. However, in alternative embodiments, other constraints may be applied to arrive at the solutions to $w_A$ and $w_B$, such as for example a constraint such as maximizing the minimum of the two SINRs.

In alternate embodiments, the set of values that $w_A$ and $w_B$ may take, can come from only a finite set of values.

In the above embodiment, the equalities (38) and (39) are derived for a MIMO system with only two receive antennas; those familiar with the state of the art can easily extend them to the case of more than two receive antennas.

In the above embodiments, the STC matrices $S_{32}$ and $S_{42}$ are considered for (3×L) and (4×L) MIMO systems respectively where L>=2, however equivalent representations to these two matrices can also be used, such as but not limited to, scaling of the rows and/or columns of these matrices or replacing the symbols $s_1$, $s_2$, $s_3$, and $s_4$ with their and/or their conjugates linear combinations. Those familiar with the art can easily extrapolate to the equivalent representations.

Thus, it is possible in every case to easily generate two equations with two unknown values (i.e., $w_A$ and $w_B$), allowing the equations to be solved and the values for the precoder diagonal values $w_A$ and $w_B$ determined. If a (3×2) STC system is used, then equation (31) is true; while if a (4×2) STC system is used, then equation (32) is true. In addition, if the first canceling order is used for MMSE-SIC, then equation (38) is true; while if the second canceling order is used for MMSE-SIC, then equation (39) is true.

Once the precoder diagonal values $w_A$ and $w_B$ are determined, they can then be sent to the transmitter with much less overhead as compared to a fully-populated precoding matrix W. With these two values $w_A$ and $w_B$, the transmitter can create the desired precoding matrix W, as set forth in equations (22) and (23) for the proper size of precoding matrix W.

Figure 3:
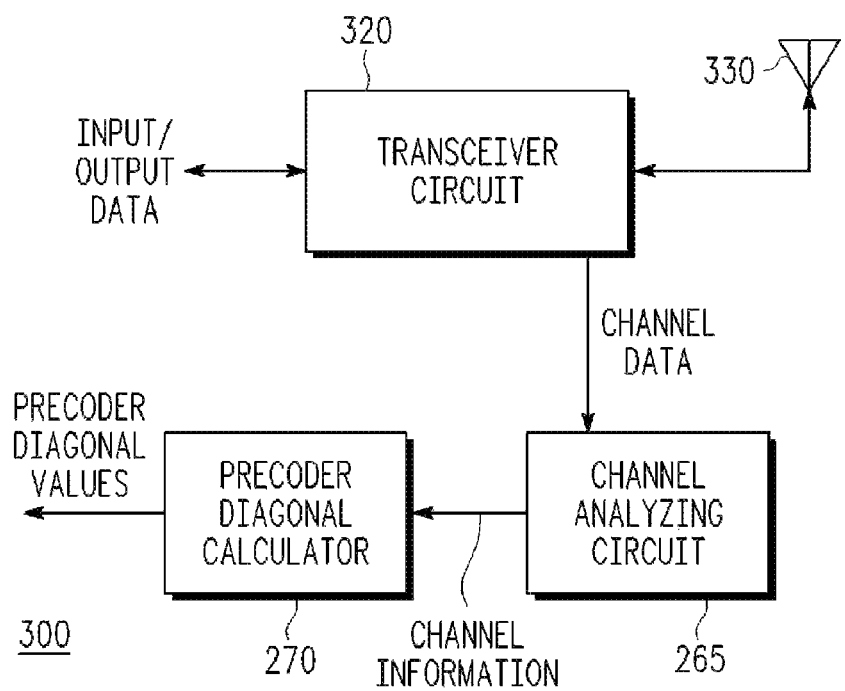
FIG. 3 is a block diagram of a transceiver for determining precoder diagonal values, according to disclosed embodiments.

FIG. 3 is a block diagram of a transceiver for determining precoder diagonal values, according to disclosed embodiments. As show in FIG. 3, the transceiver 300 includes a transceiver circuit 320, an antenna array 330, a channel analyzing circuit 265, and a precoder diagonal calculator 270. The transceiver could refer to a MIMO receiver as described above, or a MIMO transmitter operating in a manner similar to that described above, but in which the transmitter performs the channel analysis and precoder diagonal calculation.

The transceiver circuit 320 includes all of the circuitry necessary to transmit and receive MIMO signals.

The antenna array 330 may include a set of M transmit antennas and L receive antennas so that the transceiver can both send and receive MIMO signals. In some embodiments a single set of antennas can be used for both transmitting and receiving, with only the required number of antennas used for transmit and receive operations. The channel analyzing circuit 265 can take channel data from the transceiver circuit and use this channel data to determine needed channel information (e.g., values for the channel matrix H, and the noise variance $\sigma^2$). This can occur, for example, when a set of know pilot data is sent across the channel.

As with the precoder diagonal calculator 265 of FIG. 2, the precoder diagonal calculator 270 takes the channel information from the channel analyzing circuit 265, along with any other required system information (e.g., system transmit power $P_t$), and uses this data (i.e., the channel information and the other required system information) to generate the precoder diagonal values $w_A$ and $w_B$. These precoder diagonal values $w_A$ and $w_B$ can then be used as needed. For example, they could be provided to a precoding circuit, or stored in a memory, or provided to a remote device such as an associated MIMO transmitter.

As noted above, the precoder diagonal values $w_A$ and $w_B$ can be a pair of scalar values or a vector value. In the latter case, a quantized vector $[w_A \ w_B]$ can be determined using known methods of vector quantization in the art. This method is sometimes referred to as codebook based precoding.

In particular, a multiple-input/multiple-output receiver is provided, comprising: a receiver circuit configured to receive a plurality of multiple-input/multiple-output signals from a remote device over a wireless channel, the wireless channel including a plurality of channel paths; a channel analyzing circuit configured to detect signal quality data and channel data from the plurality of multiple-input/multiple-output signals, the signal quality data including at least one measure of a quality of the plurality of multiple-input/multiple-output signals, and the channel data including a measure of respective channel properties of each of the plurality of channel paths; and a precoder diagonal value calculator configured to determine first and second precoder diagonal values based on the signal quality data, the channel data, a transmit power of the plurality of multiple-input/multiple-output signals, and one or more constrained system performance parameters.

The multiple-input/multiple-output receiver may be a part of one of a (3×L) multiple-input/multiple-output system and a (4×L) multiple-input/multiple-output system, where L is an integer greater than or equal to 2.

The multiple-input/multiple-output receiver may further comprise a plurality of antenna elements connected to the receiver circuit for receiving the plurality of multiple-input/multiple-output signals.

The signal quality data may comprises the noise variance of the plurality of multiple-input/multiple-output signals.

The receiver circuit may be further configured to perform a successive interference cancellation operation on a plurality of symbol pairs contained in the plurality of multiple-input/multiple-output signals.

The precoder diagonal value calculator may determine the first and second precoder diagonal values by selecting them from a limited set of possible scalar or vector values. The precoder diagonal value calculator may determine the first and second precoder diagonal values by generating a vector value.

The one or more constrained system performance parameters may be signal-to-noise-plus-interference ratios of two symbol pairs contained in the plurality of multiple-input/multiple-output signals.

The receiver may be further configured to perform a minimum mean square estimation successive interference cancellation process on the plurality of multiple-input/multiple-output signals from the remote device.

The multiple-input/multiple-output receiver may be implemented using an integrated circuit.

Effectiveness of Precoding

Figure 4:
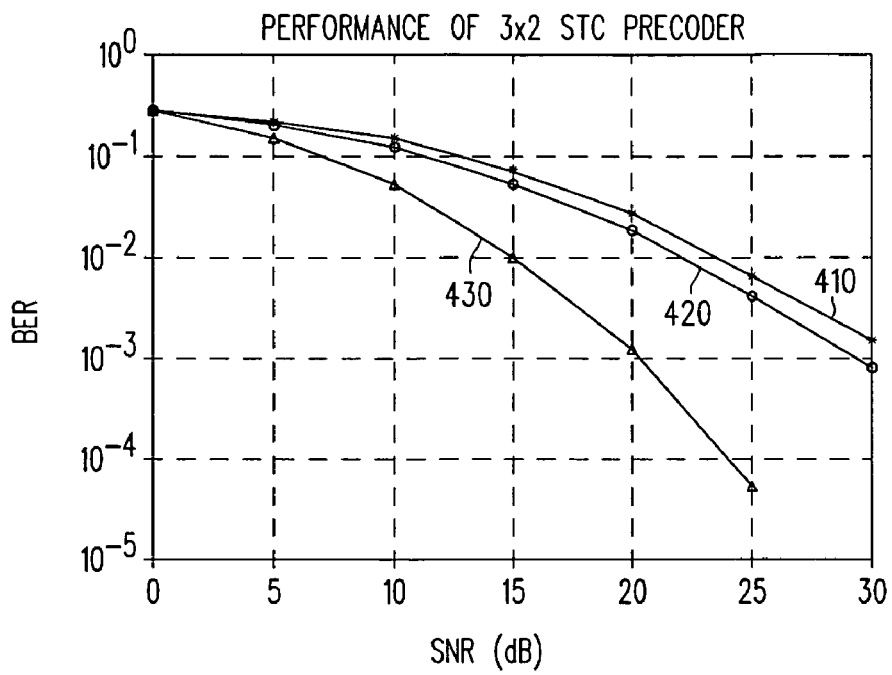
FIG. 4 is a graph showing the bit error rate of the circuit of FIG. 2 using a 3×2 precoder, according to as disclosed embodiment.

The use of the proposed embodiments of precoder design can provide significant performance benefits for a MIMO system. FIG. 4 is a graph showing the bit error rate (BER) versus the signal-to-noise ratio (SNR) of the circuit of FIG. 2 in a (3×2) MIMO system, according to a disclosed embodiment, while FIG. 5 is a graph showing the BER versus the SNR of the circuit of FIG. 2 using a (4×2) MIMO system, according to a disclosed embodiment.

In particular, FIG. 4 shows the operation of an MMSE (3×2) MIMO system without precoding (410), the operation of an MMSE-SIC (3×2) MIMO system without precoding (420), and the operation of an MMSE-SIC (3×2) MIMO system with precoding (430). Similarly, FIG. 5 shows the operation of an MMSE (4×2) MIMO system without precoding (510), the operation of an MMSE-SIC (4×2) MIMO system without precoding (520), and the operation of an MMSE-SIC (4×2) MIMO system with precoding (530).

Figure 5:
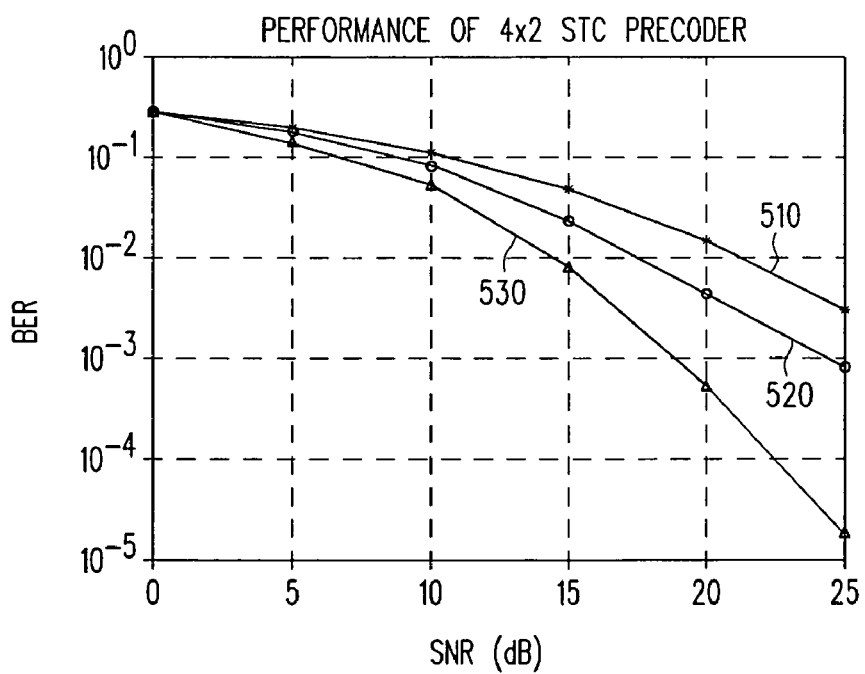
FIG. 5 is a graph showing the bit error rate of the circuit of FIG. 2 using a 4×2 precoder, according to as disclosed embodiment.

As shown in FIGS. 4 and 5, depending on the allowable BER, significant gains in SNR can be achieved. For example, in a (3×2) MIMO system, a 9 dB gain in SNR can be achieved at a BER rate of $10^{-3}$, while in a (4×2) MIMO system, a 6 dB gain in SNR can be achieved at a BER rate of $10^{-3}$.

Methods of Operation

Figure 6:
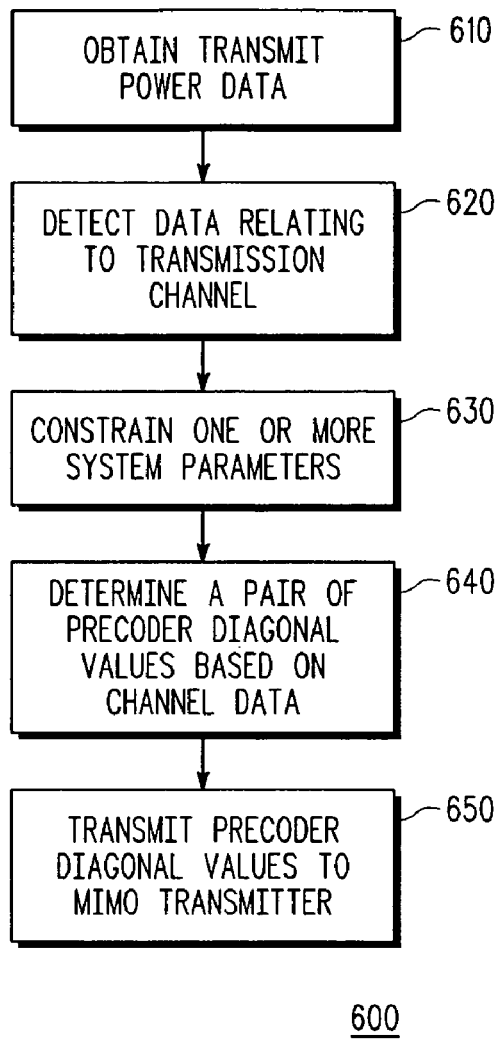
FIG. 6 is a flow chart showing a method of operating a MIMO transmitter according to a disclosed embodiment.

FIG. 6 is a flow chart showing a method of operating a MIMO receiver according to a disclosed embodiment. Although this embodiment discloses a receiver performing these operations, in alternate embodiments they could be performed by a transmitter.

As shown in FIG. 6, the MIMO receiver begins by obtaining transmit power data indicating the transmit power level for a set of MIMO signals. This information may be known beforehand, may be generated as needed for signal transmission, or may be provided by a remote device (e.g., a paired MIMO transmitter).

The MIMO receiver then detects data relating to a transmission channel. (620) This is generally achieved by having a MIMO transmitter send a known set of bits across the transmission channel, and having the receiver use this known pattern to determine the parameters of a channel matrix H and a value for the noise variance $\sigma^2$.

In alternate embodiments in which the transmitter is performing this operation, it can either detect the data relating to the transmission channel, or it could receive the information from other sources.

The receiver then constrains one or more system parameters (630). For example, in one embodiment it might require that the SINR of two pairs of symbols in the received MIMO signal be equal; in another embodiment it might constrain the SINR thresholds for two pairs of symbols in the received MIMO signal.

The receiver then determines a pair of diagonal precoder values based on the data relating to a transmission channel, the transmit power, and the constrained system parameters. (640) This can be achieved, for example, by using equations (27)-(39), as noted above.

The receiver then transmits the diagonal values to an associated MIMO transmitter (650), so that the transmitter can generate a proper precoding matrix W. In alternate embodiments, however, the receiver can store these values locally so that it too can generate a precoding matrix W appropriate to its measurements.

In alternate embodiments a MIMO transmitter may perform a similar operation. In such embodiments the MIMO transmitter could perform the detection operation (610) described above. In the alternative, however, the MIMO transmitter could obtain the required channel data through other methods. For example, it could be given the data by an external source, it could perform a channel sounding, or any other desirable method.

Figure 7:
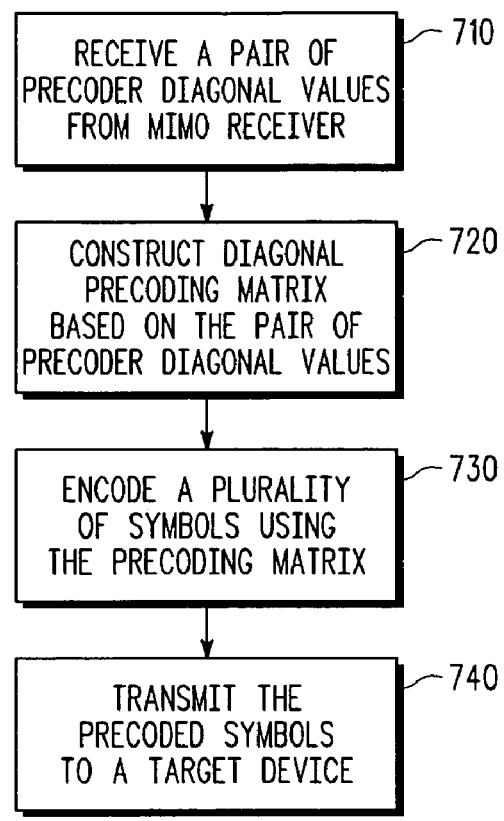
FIG. 7 is a flow chart showing a method of operating a MIMO transmitter according to a disclosed embodiment.

FIG. 7 is a flow chart showing a method of operating a MIMO transmitter according to a disclosed embodiment.

As shown in FIG. 7, the transmitter initially receives a pair of diagonal precoder values. (710) In various embodiments the pair of diagonal precoder values can be received from a MIMO receiver that the transmitter is communicating with, from an internal processor that generates the values, from a memory inside the transmitter, or from some other external source.

The transmitter then constructs a diagonal precoding matrix using the pair of diagonal precoder values (720), encodes a plurality of symbols using the precoding matrix (730), and transmits the precoded symbols to a target device (740).

In another embodiment, the transmitter may itself have knowledge of the channel matrix H or its equivalent representation, using which the transmitter can calculate the values $w_A$ and $w_B$ according to the equations given above and design the precoding matrix W to be used for the precoded transmission of the STC.

In particular, a method is provided for generating precoder data, comprising: obtaining transmit power data indicative of a transmit power of a plurality of multiple-input/multiple-output signals; obtaining signal quality data, the signal quality data including at least one measure of a quality of the plurality of multiple-input/multiple-output signals; obtaining channel data with respect to a wireless channel, the channel data including a measure of respective channel parameters of each of a plurality of channel paths in the wireless channel; constraining one or more system performance parameters; and determining first and second precoder diagonal values based on the signal quality data, the transmit power data, the channel data, and the one or more constrained system performance parameters.

The may further comprise receiving the plurality of multiple-input/multiple-output signals from a remote device over the wireless channel. In this case the obtaining of the signal quality data may be performed by detecting the signal quality data based on the plurality of multiple-input/multiple-output signals, and the obtaining of the channel data may be performed by detecting the channel data based on the plurality of multiple-input/multiple-output signals.

The constraining of the one or more system performance parameters may be performed by constraining signal-to-noise-plus-interference ratios of two symbol pairs contained in the plurality of multiple-input/multiple-output signals. The constraining of the one or more system performance parameters may also be performed by equating the signal-to-noise-plus-interference ratios of the two symbol pairs contained in the plurality of multiple-input/multiple-output signals.

During the determining operation, the first and second precoder diagonal values may be selected from a limited set of possible values. Or the first and second precoder diagonal values may be selected from a set constellation of vector values.

The method may further comprise generating a diagonal precoding matrix using the first and second precoder diagonal values. The method may further comprise transmitting the first and second precoder diagonal values to a remote device.

The signal quality data may comprise the noise variance of the plurality of multiple-input/multiple-output signals.

The plurality of multiple-input/multiple-output signals may be received in a multiple-input/multiple-output system with either three or four transmitter antennas and L receiver antennas, where L is an integer greater than or equal to 2.

The receiving may further comprise performing a successive interference cancellation operation on a plurality of symbol pairs contained in the plurality of multiple-input/multiple-output signals.

The method may further comprise performing minimum mean square estimation operation successive interference cancellation operation on the plurality of multiple-input/multiple-output signals A method is also provided for generating multiple-input/multiple-output signals, comprising: obtaining first and second precoder diagonal values; generating a diagonal precoding matrix based on the first and second precoder diagonal values; receiving a stream of data bits; encoding a plurality of data bits in the stream of bits into a plurality of symbols chosen from a set symbol constellation; encoding the plurality of symbols into a space-time-code matrix according to a set space time code; multiplying the space-time-code matrix by the precoding matrix to generate a transmit matrix containing a plurality of modified symbols.

In one embodiment the first precoder diagonal value forms both a corner element in the precoding matrix, and an internal element in the precoding matrix, the internal element being adjacent to the corner element.

The first and second precoder diagonal values may be obtained as a vector. The first and second precoder diagonal values may also be received from a remote device.

The method may further comprise: converting the plurality of modified symbols in the transmit matrix into a plurality of transmit signals suitable for transmission over a wireless channel; and transmitting the transmit symbols from the transmit matrix over the wireless channel.

The diagonal precoding matrix may be one of a (4×4) diagonal matrix or a (3×3) diagonal matrix.

The diagonal precoding matrix may be designed to improve a minimum mean square estimation successive interference cancellation process on a received copy of the transmit matrix, as compared to a received copy of the space-time-code matrix. These methods may be implemented using an integrated circuit.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. For example, although the specifically disclosed embodiments all relate to either a (4×2) or (3×2) MIMO system, it will be understood by those skilled in the art that it could be expanded to apply to any (4×L) or (3×L) system, where L is an integer greater than 1.

All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method for generating multiple-input/multiple-output signals, comprising:
   obtaining first and second precoder diagonal values;
   generating all elements in an M-by-M diagonal precoding matrix based only on the first and second precoder diagonal values, where M is an integer greater than 2;
   receiving a stream of data bits;
   encoding a plurality of data bits in the stream of bits into a plurality of symbols chosen from a set symbol constellation;

encoding the plurality of symbols into a space-time-code matrix according to a set space time code;

multiplying the space-time-code matrix by the precoding matrix to generate a transmit matrix containing a plurality of modified symbols.

2. The method of claim 1, wherein the first precoder diagonal value forms both a corner element in the precoding matrix, and an internal element in the precoding matrix, the internal element being adjacent to the corner element.

3. The method of claim 1, wherein the first and second precoder diagonal values are obtained as a vector.

4. The method of claim 1, wherein the diagonal preceding matrix is one of a (4×4) diagonal matrix or a (3×3) diagonal matrix.

5. The method of claim 1, wherein the diagonal precoding matrix is designed to improve a minimum mean square estimation successive interference cancellation process on a received copy of the transmit matrix, as compared to a received copy of the space-time-code matrix.

6. The method of claim 1, wherein the method is implemented using an integrated circuit.

7. A multiple-input/multiple-output apparatus, comprising a Transmitter/receiver pair configured to:
   obtain first and second precoder diagonal values;
   generate all elements in an M-by-M diagonal precoding matrix based only on the first and second precoder diagonal values, where M is an integer greater than 2;
   receive a stream of data bits;
   encode a plurality of data bits in the stream of bits into a plurality of symbols chosen from a set symbol constellation;
   encode the plurality of symbols into a space-time-code matrix according to a set space time code;
   multiply the space-time-code matrix by the precoding matrix to generate a transmit matrix containing a plurality of modified symbols.

8. The apparatus of claim 7, wherein the first and second precoder diagonal values are selected from a limited set of possible values.

9. The apparatus of claim 7, wherein the first and second precoder diagonal values are selected from a set constellation of vector values.

10. The apparatus of claim 7, further configured to transmit the first and second precoder diagonal values to a remote device.

11. The apparatus of claim 7, wherein the first precoder diagonal value forms both a corner element in the precoding matrix and an internal element in the precoding matrix, the internal element being adjacent to the corner element.

12. The apparatus of claim 7, wherein the first and second precoder diagonal values are obtained as a vector.

13. The apparatus of claim 7, wherein the diagonal precoding matrix is one of a (4×4) diagonal matrix or a (3×3) diagonal matrix.

14. The apparatus of claim 7, wherein the diagonal precoding matrix is designed to improve a minimum mean square estimation successive interference cancellation process on a received copy of the transmit matrix, as compared to a received copy of the space-time-code matrix.

15. The apparatus of claim 7, wherein the apparatus comprises an integrated circuit.

* * * * *